(12) United States Patent
Opushnyev et al.

(10) Patent No.: US 12,333,542 B2
(45) Date of Patent: Jun. 17, 2025

(54) SYSTEMS, METHODS, AND NON-TRANSITORY COMPUTER-READABLE MEDIA FOR AUTHENTICATION AND AUTHORIZATION OF PAYMENT REQUEST

(71) Applicant: MASTERCARD TECHNOLOGIES CANADA ULC, Vancouver (CA)

(72) Inventors: Igor Opushnyev, New Westminster (CA); Mansur Mirani, Vancouver (CA); Perry McGee, Vancouver (CA); Ranjita Shankar Iyer, Chappaqua, NY (US); Ryan B. J. Crowe, Long Island City, NY (US)

(73) Assignee: MASTERCARD TECHNOLOGIES CANADA ULC, Vancouver (CA)

( * ) Notice: Subject to any disclaimer, the term of this patent is extended or adjusted under 35 U.S.C. 154(b) by 63 days.

(21) Appl. No.: 17/832,796

(22) Filed: Jun. 6, 2022

(65) Prior Publication Data

US 2022/0391908 A1 Dec. 8, 2022

Related U.S. Application Data

(60) Provisional application No. 63/197,758, filed on Jun. 7, 2021.

(51) Int. Cl.
*G06Q 20/40* (2012.01)
*G06Q 20/02* (2012.01)
*G06Q 20/38* (2012.01)

(52) U.S. Cl.
CPC ......... *G06Q 20/4014* (2013.01); *G06Q 20/02* (2013.01); *G06Q 20/386* (2020.05)

(58) Field of Classification Search
CPC .... G06Q 20/4014; G06Q 20/02; G06Q 20/40; G06Q 20/3829; G06Q 20/10

(Continued)

(56) References Cited

U.S. PATENT DOCUMENTS 8,484,046 B1 * 7/2013 Bauer ............... G06Q 40/08
 705/2
8,595,034 B2 * 11/2013 Bauer ............... G07C 5/008
 702/188

(Continued)

FOREIGN PATENT DOCUMENTS

EP 3493134 A1 6/2019
WO WO-2009086155 A1 * 7/2009 ............ G06Q 30/06
WO 2020222143 A1 11/2020

OTHER PUBLICATIONS

International Search Report and Written Opinion for Application No. PCT/CA2022/050901 dated Aug. 9, 2022 (9 pages).

*Primary Examiner* — Hani M Kazimi
*Assistant Examiner* — Sanjeev Malhotra
(74) *Attorney, Agent, or Firm* — Michael Best & Friedrich LLP (57) ABSTRACT

Systems, methods, and non-transitory computer-readable media for authentication and authorizing a payment request. In one embodiment, the system includes a server including a first memory and a first electronic processor communicatively connected to the first memory. The first electronic processor is configured to receive the payment request, three-domain secure (3DS) data, and fast ID online (FIDO) data, output an authentication request that includes a portion of the 3DS data and a portion of the FIDO data, receive an authentication response based on the 3DS data and the FIDO data, the authentication response including one or more authentications, output the payment request based on the authentication response, and receive an authorization or a denial of the payment request.

20 Claims, 4 Drawing Sheets

(58) Field of Classification Search
USPC .............. 705/37, 44, 66, 71, 2; 702/188
See application file for complete search history.

(56) References Cited

U.S. PATENT DOCUMENTS

| | | | |
|---|---|---|---|
| 2014/0279368 A1* | 9/2014 | Chan .................. | G06Q 40/06 705/37 |
| 2015/0199684 A1* | 7/2015 | Maus .................. | H04L 67/12 705/71 |
| 2015/0294313 A1* | 10/2015 | Kamal ................ | G06Q 20/322 705/44 |
| 2015/0348026 A1* | 12/2015 | Roberts ............. | G06Q 20/3827 705/44 |
| 2018/0003271 A1* | 1/2018 | Dutil .................. | F16H 7/0831 |
| 2019/0392440 A1* | 12/2019 | Ederle ............... | G06Q 20/3226 |
| 2020/0372495 A1* | 11/2020 | Maheshwari ...... | G06Q 20/3678 |
| 2022/0391908 A1* | 12/2022 | Opushnyev ........ | G06Q 20/4014 |
| 2023/0162183 A1* | 5/2023 | Osborn .............. | G06Q 20/12 705/66 |

\* cited by examiner

SYSTEMS, METHODS, AND NON-TRANSITORY COMPUTER-READABLE MEDIA FOR AUTHENTICATION AND AUTHORIZATION OF PAYMENT REQUEST

CROSS-REFERENCE TO RELATED APPLICATION

This application claims the benefit of, and priority to, U.S. Provisional Application No. 63/197,758, filed on Jun. 7, 2021, the entire contents of which are incorporated herein by reference.

FIELD OF THE INVENTION

The present disclosure relates generally to authentication and authorization. More specifically, the present disclosure relates systems, methods, and non-transitory computer-readable media for authentication and authorization of a payment request.

BACKGROUND

Three-Domain Secure (3DS) is a messaging protocol that enables consumers to authenticate themselves with an issuer when making card-not-present transactions. The 3DS consists of a merchant/acquirer domain, an issuer domain, and an interoperability domain. However, 3DS 1.0 is vulnerable to phishing attacks as the authentication window itself is not verified.

3DS 2.0 is less vulnerable than 3DS 1.0 and allows for contextual data to be sent to the customer's bank (including mailing addresses and transaction history) to verify and assess the risk of the transaction. The customer would only be required to pass an authentication challenge if their transaction is determined to be of a high risk. In addition, 3DS 2.0 does not require a re-direct to a separate page and may activate an out-of-band authentication via an institution's mobile app (which, in turn, can also be used with biometric authentication). However, 3DS 2.0 is nonetheless vulnerable to fraudulent transactions that are determined "low-risk" because 3DS 2.0 does not require an authentication challenge when the transactions are deemed "low risk."

SUMMARY

The systems, methods, and non-transitory computer-readable media of the present disclosure solve the vulnerabilities associated with the 3DS 2.0 protocol. In particular, the systems, methods, and non-transitory computer-readable media of the present disclosure leverage fast identification online (FIDO), which is conventionally only used for authenticating passwords, to perform a device-based authentication and additional layer of the payment card protection performing payment card authentication with FIDO for each transaction. The leveraging of FIDO reduces or eliminates the vulnerability of 3DS 2.0 to fraudulent transactions that are deemed "low risk" because each transaction will be authenticated by a device-based authentication.

Additionally, the leveraging of FIDO allows for an "enrollment" of a 3DS and FIDO client device by an authentication network device. This "enrollment" enhances a user's experience as well as reduces the computational burden of the authentication network device because a user of the 3DS and FIDO client device does not need to receive a one-time password (OTP) that might be lost when the OTP is delivered or timed out. Instead, the user may use an authentication method like secure PIN, face recognition, fingerprint, secure electronic token, or other suitable authentication method that may be specific to a merchant or specific to the 3DS and FIDO client device.

Further, the authentication data (PIN, fingerprint digital model, or other suitable authentication data) is not stored on the device or the server. Instead, the authentication data is retrieved by the FIDO client on the consumer device at the moment of the FIDO authentication, used exclusively for the FIDO authentication, never travels outside of the consumer device, and is destroyed after the FIDO authentication is completed.

The conventional usage of is to provide a two-factor authentication method or perform password-less authentication. Unlike the conventional usage of FIDO, the present disclosure includes a method to provide an additional level of the payment card protection by performing the card and cardholder authentication using the FIDO Authenticator registered for the card. Successful FIDO authentication guarantees that the card holder has passed Identification and Verification (ID&V) with the card issuer during the card registration process with FIDO. The incorporation of the existing FIDO Authenticator is another improvement that uses the authentication network device on top of the 3DS rails for payment transaction risk evaluation and authorization based on the payment card FIDO authentication data sent with 3DS Authentication Request.

One embodiment of the present disclosure includes a system for authenticating and authorizing a payment request. The system includes a server including a first memory and a first electronic processor communicatively connected to the first memory. The first electronic processor is configured to receive the payment request, three-domain secure (3DS) data, and fast ID online (FIDO) data, output an authentication request that includes a portion of the 3DS data and a portion of the FIDO data, receive an authentication response based on the 3DS data and the FIDO data, the authentication response including one or more authentications, output the payment request based on the authentication response, and receive an authorization or a denial of the payment request.

Another embodiment of the present disclosure includes a method for authenticating and authorizing a payment request. The method includes receiving, with a server, the payment request, three-domain secure (3DS) data, and fast ID online (FIDO) data. The method includes outputting, with the server, an authentication request including a portion of the 3DS data and a portion of the FIDO data. The method includes receiving, with the server, an authentication response based on the portion of the 3DS data and the portion of the FIDO data, the authentication response including one or more authentications. The method includes outputting, with the server, the payment request based on the authentication response. The method also includes receiving, with the server, an authorization or a denial of the payment request.

Yet another embodiment of the present disclosure includes a non-transitory computer-readable medium comprising instructions that, when executed by an electronic processor, causes the electronic processor to perform a set of operations. The set of operations includes receiving a payment request, three-domain secure (3DS) data, and fast ID online (FIDO) data. The set of operations includes outputting an authentication request including a portion of the 3DS data and a portion of the FIDO data. The set of operations includes receiving an authentication response based on the authentication request, the authentication response including one or more authentications. The set of operations includes outputting the payment request based on the authentication response. The set of operations also includes receiving an authorization or a denial of the payment request.

Yet another embodiment of the present disclosure includes a non-transitory computer-readable medium comprising instructions that, when executed by an electronic processor, causes the electronic processor to perform a set of operations. The set of operations includes receiving an input indicating a payment request. The set of operations includes requesting a fast ID online (FIDO) data from a FIDO server in response to receiving the input. The set of operations includes receiving the FIDO data from the FIDO server in response to requesting the FIDO data. The set of operations includes outputting 3DS data and the FIDO data to a second server in response to receiving the input and the FIDO data. The set of operations also includes receiving acknowledgement of authorization of the payment request from the second server based on the FIDO data and the 3DS data that is output to the second server.

DETAILED DESCRIPTION OF THE EMBODIMENTS

Figure 1:
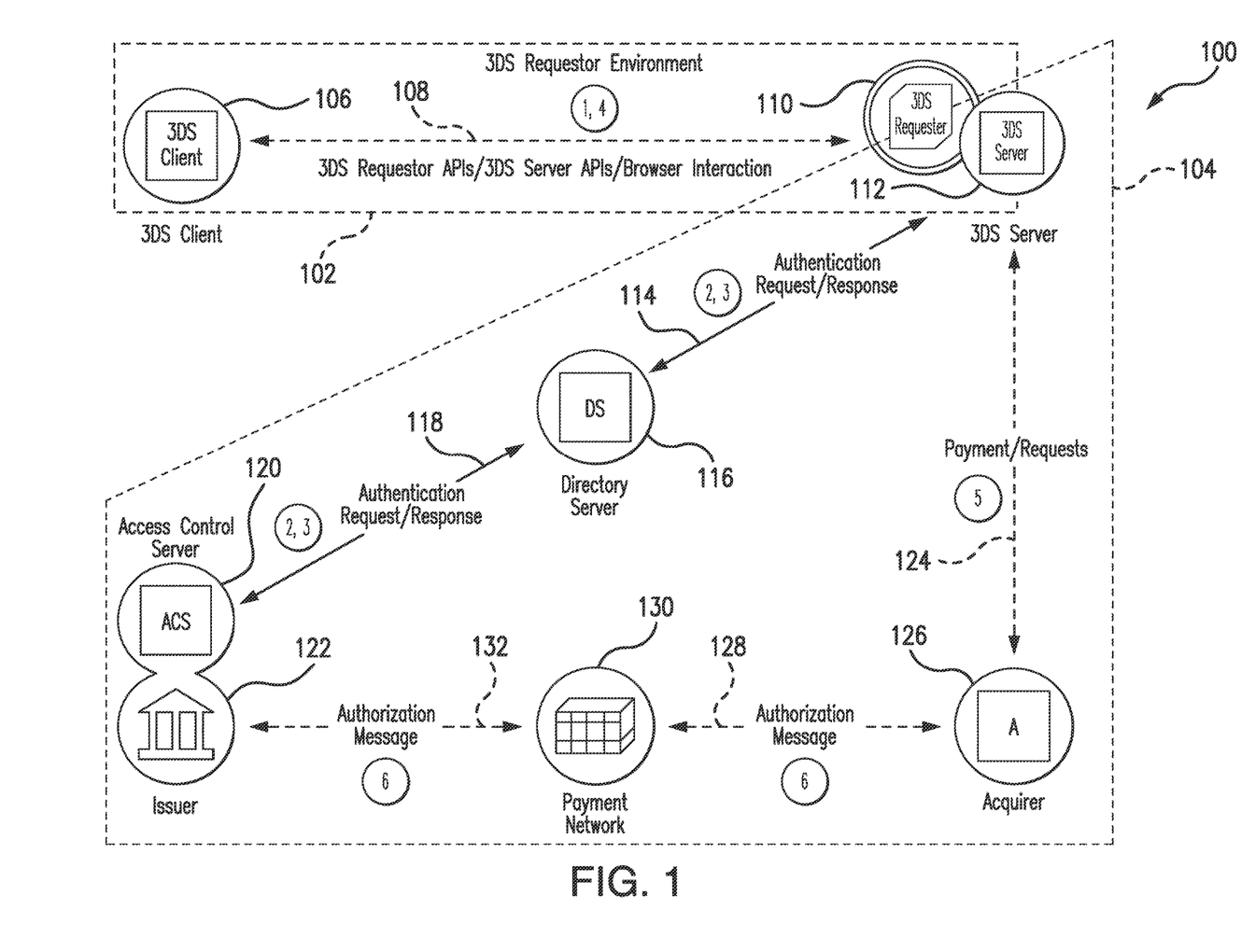
FIG. 1 illustrates an example conventional system for authentication with three-domain secure (3DS) 2.0.

FIG. 1 illustrates an example conventional system 100 for authentication with three-domain secure (3DS) 2.0. In the example of FIG. 1, the system 100 includes a three-domain secure (3DS) requestor environment 102 and a three-domain secure (3DS) authentication and authorization environment 104.

The 3DS requestor environment 102 includes a 3DS client 106, a 3DS requestor 110 that is implemented on a 3DS server 112. For example, the 3DS client 106 is a computing device that allows user interface with the 3DS requestor 110. In some examples, the 3DS client 106 may be a smartphone, a tablet, a laptop, or a desktop.

The 3DS requestor 110 may be a merchant or a digital wallet that initiates the 3DS authentication request within a purchase flow. The 3DS server 112 is a server that handles online transactions and facilitates communication between the 3DS requestor 110 and the 3DS authentication and authorization environment 104. The 3DS server 112 may also be implemented by one or more networked computer servers.

The 3DS client 106 communicates with the 3DS requestor 110 via a communication link 108. In some examples, the communication link 108 may be 3DS requestor application programming interfaces (APIs), 3DS server APIs, and a browser interaction.

The 3DS client 106 includes an electronic processor, a communication interface, and a memory. The electronic processor is communicatively coupled to the communication interface and the memory via a communication bus. The electronic processor is a microprocessor or another suitable processing device. The communication interface may be implemented as one or both of a wired network interface and a wireless network interface. The memory is one or more of volatile memory (e.g., RAM) and non-volatile memory (e.g., ROM, FLASH, magnetic media, optical media, et cetera). In some examples, the memory is also a non-transitory computer-readable medium. The memory may be, at least in part, implemented as network storage that is external to the 3DS client 106 and accessed via the communication interface. For example, all or part of memory may be housed on the "cloud."

The 3DS server 112 includes an electronic processor, a communication interface, and a memory. The electronic processor is communicatively coupled to the communication interface and the memory via a communication bus. The electronic processor is a microprocessor or another suitable processing device. The communication interface may be implemented as one or both of a wired network interface and a wireless network interface. The memory is one or more of volatile memory (e.g., RAM) and non-volatile memory (e.g., ROM, FLASH, magnetic media, optical media, et cetera). In some examples, the memory is also a non-transitory computer-readable medium. The memory may be, at least in part, implemented as network storage that is external to the 3DS server 112 and accessed via the communication interface. For example, all or part of memory may be housed on the "cloud."

In the example of FIG. 1, a user (e.g., an online-customer or "cardholder") in the 3DS client 106 (e.g., a web browser on the user's computing device) checks-out at a merchant's site and enters details of the user's remuneration vehicle. If the merchant's site enables 3DS, the merchant's site implements the 3DS requestor 110. The 3DS requestor 110 via the 3DS server 112 initiates contact with the 3DS authentication and authentication environment 104.

The 3DS authentication and authorization environment 104 includes the 3DS server 112, a directory server 116, an access control server 120, an issuer 122, an acquirer 126, and a payment network 130.

The directory server 116 is communicatively connected to the 3DS server 112 via a communication link 114. The directory server 116 and the 3DS server 112 communicate authentication requests and responses via the communication link 114. The 3DS server 112 authenticates the user's payment card in 3DS by sending to the directory server 116 an Authentication Request (AReq) which includes the user's payment card number (also referred to as a "primary account number" (PAN)). The directory server 116 uses the PAN to find the Access Control Server (ACS) 120 associated with the PAN and a particular issuer 122.

The directory server 116 is communicatively connected to the ACS 120 via a communication link 118. The directory server 116 forwards the authentication and requests and response to the ACS 120 that is associated with the PAN via the communication link 118 to determine whether the user's card is enrolled in 3DS.

The ACS 120 responds to the directory server 116 by authenticating (e.g., a risk-based authentication) the user's card with the given PAN via the communication link 118. Upon receiving the response from the ACS 120, the directory server 116 responds to the 3DS server 112 with an Authentication Response (ARes) message, confirming to the 3DS server 112 the card is authenticated. If card is authenticated, the ARes message includes the URL of the ACS 120 of the issuer 122.

After receiving the ARes message that authenticates the user's card, the 3DS server 112 transmits a payment authorization request message to an acquirer 126 via a communication link 124. The payment authorization request message includes the URL of the ACS 120 of the issuer 122. Upon receiving the payment authorization request message from the 3DS server 112, the acquirer 126 transmits an authorization message to the ACS 120 and the issuer 122 via the payment network 130 and the communication links 128 and 132. The ACS 120 and the issuer 122 transmits an authorization of the payment back to the acquirer 126 via the via the payment network 130 and the communication links 128 and 132. Upon receiving the authorization of the payment, the acquirer 126 confirms authorization of the payment authorization message to the 3DS server 112 and the 3DS requestor 110.

Figure 2:
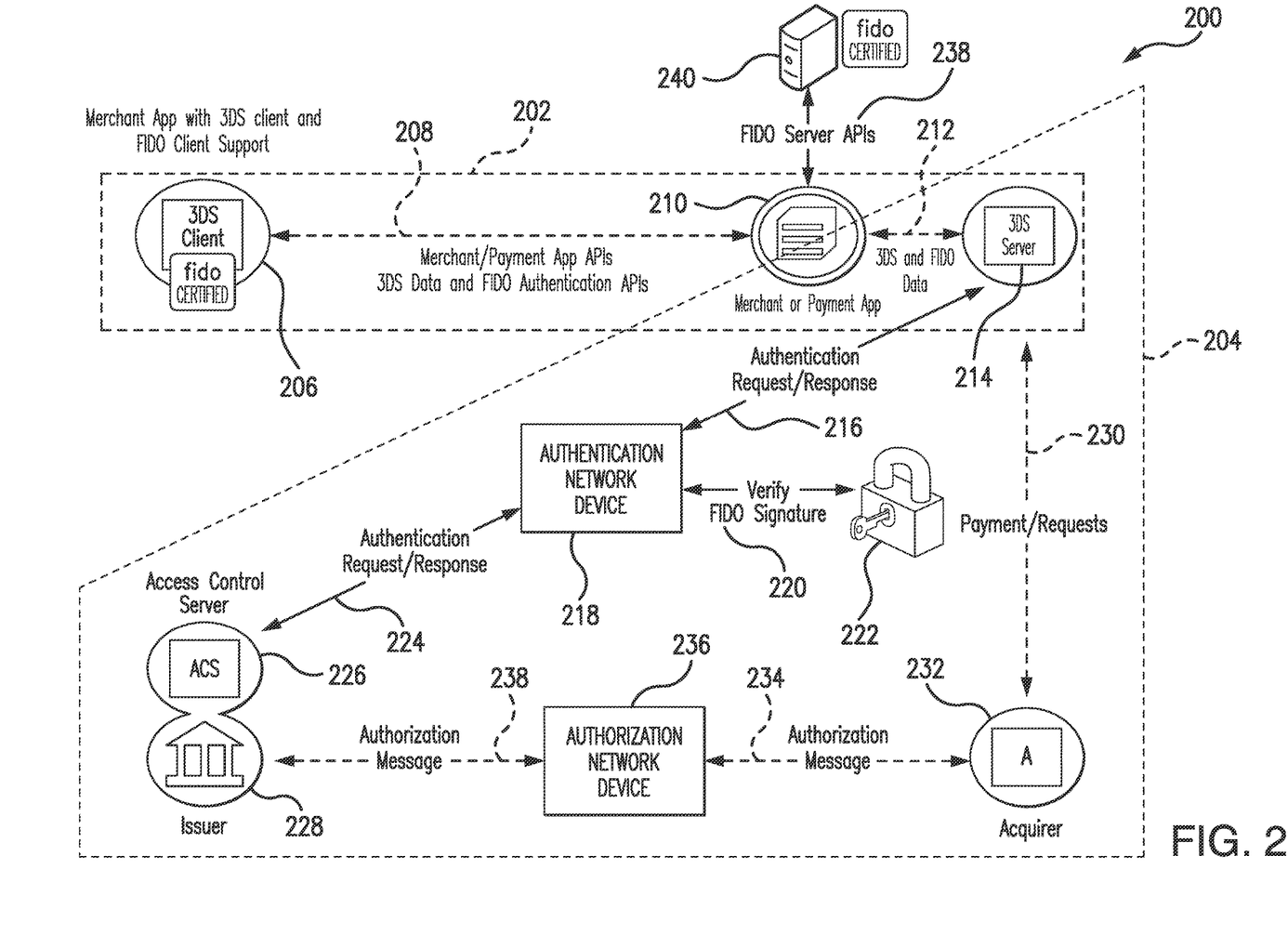
FIG. 2 illustrates an example system for authentication and authorization of a payment request, in accordance with some aspects of the present disclosure.

FIG. 2 illustrates an example system 200 for authentication and authorization of a payment request, in accordance with some aspects of the present disclosure. In the example of FIG. 2, the system 200 includes a three-domain secure (3DS) and fast ID online (FIDO) requestor environment 202, a three-domain secure (3DS) authentication and authorization environment 204, and FIDO server 240.

The 3DS and FIDO requestor environment 202 includes a 3DS and FIDO client 206, a 3DS and MO merchant/payment application 210, and a 3DS server 214. For example, the 3DS and FIDO client 206 is a computing device that allows a user to either execute, or interface with, the 3DS and FIDO merchant/payment application 210. In some examples, the 3DS and FIDO client 206 may be a smartphone, a tablet, a laptop, a desktop, or other suitable computing device that executes the 3DS and FIDO merchant/payment application 210.

The 3DS and FIDO merchant/payment application 210 may be a merchant or a digital wallet application that initiates the 3DS authentication request and a FIDO authentication request within a purchase flow. The 3DS server 214 is a server that handles online transactions and facilitates communication between the 3DS and FIDO merchant/payment application 210 and the 3DS and FIDO authentication and authorization environment 204. The 3DS server 214 may also be implemented by one or more networked computer servers.

The 3DS and FIDO client 206 communicates with the 3DS and FIDO merchant/payment application 210 via a communication link 208. In some examples, when the 3DS and FIDO client 206 executes the 3DS and FIDO merchant/payment application 210, the communication link 208 may be communication via merchant/payment application programming interfaces (APIs), 3DS authentication APIs, and FIDO authentication APIs. In other examples, when the 3DS and FIDO client 206 interfaces with the 3DS and FIDO merchant/payment application 210, the communication link 208 may be communication via 3DS authentication APIs, FIDO authentication APIs, and a browser interaction.

The 3DS and FIDO client 206 includes an electronic processor, a communication interface, and a memory. The electronic processor is communicatively coupled to the communication interface and the memory via a communication bus. The electronic processor is a microprocessor or another suitable processing device. The communication interface may be implemented as one or both of a wired network interface and a wireless network interface. The memory is one or more of volatile memory (e.g., RAM) and non-volatile memory (e.g., ROM, FLASH, magnetic media, optical media, et cetera). In some examples, the memory is also a non-transitory computer-readable medium. The memory may be, at least in part, implemented as network storage that is external to the 3DS and FIDO client 206 and accessed via the communication interface. For example, all or part of memory may be housed on the "cloud." The memory also includes a 3DS and FIDO application.

The 3DS server 214 includes an electronic processor, a communication interface, and a memory. The electronic processor is communicatively coupled to the communication interface and the memory via a communication bus. The electronic processor is a microprocessor or another suitable processing device. The communication interface may be implemented as one or both of a wired network interface and a wireless network interface. The memory is one or more of volatile memory (e.g., RAM) and non-volatile memory (e.g., ROM, FLASH, magnetic media, optical media, et cetera). In some examples, the memory is also a non-transitory computer-readable medium. The memory may be, at least in part, implemented as network storage that is external to the 3DS server 214 and accessed via the communication interface. For example, all or part of memory may be housed on the "cloud."

In the example of FIG. 2, a user (e.g., an online-customer or "cardholder") in the 3DS and FIDO client 206 (e.g., a merchant/payment application on the user's computing device or a web browser on the user's computing device) checks-out at a merchant's site and enters details of the user's remuneration vehicle and executes, or interfaces with, the 3DS and FIDO merchant/payment application 210.

The 3DS and FIDO merchant/payment application 210 initiates contact with the FIDO server 240 via a communication link 238 to retrieve FIDO authentication data. In some examples, the communication link 238 may include communication via FIDO server APIs. For example, when the user of the 3DS and FIDO client 206 has chosen a PIN as a FIDO authentication method for the given payment card, the 3DS and FIDO client 206 generates a public/private key associated with the given card in the SDK on the 3DS and FIDO client 206 and the FIDO server 240. A public key is sent to and stored on the FIDO server 240, but the private key protected by the PIN remains in the memory of the 3DS and FIDO client 206. When the user of the 3DS and FIDO merchant/payment application 210 authenticates with that PIN, and the PIN is correct, the private key associated with the selected payment card will be unlocked, the FIDO authentication request will be signed with the private key and sent to the FIDO server 240 where the digital signature will be verified using the public key. When matched, the FIDO server 240 returns a certain response called the FIDO Attestation Data. The FIDO attestation data cryptographically protected the way the authentication network device 218 can verify the data authenticity, integrity and origin. The 3DS and FIDO client 206 bundles the response from the FIDO server 240 with the EMV 3DS's request.

The 3DS and FIDO merchant/payment application 210 then initiates contact with the 3DS and FIDO authentication and authorization environment 204 via the 3DS server 214. For example, the 3DS and FIDO merchant/payment application 210 transmits both 3DS data and FIDO data to the 3DS server 214.

In other words, a device authentication flag is included in the 3DS2 request. The authentication network device 218 will verify the information that indicates a new authenticator enrolled for a device (i.e., the 3DS and FIDO client 206) and is also specific to a particular mobile application, merchant application, or merchant website. The authentication network device 218 authenticates that the authenticator considers valid, and when valid, the authentication network device 218 then saves certain information to a database that for subscript transactions are necessary to determine a future match. This "enrollment" by the authentication network device 218 also enhances the user's experience as well because the user of the 3DS and FIDO client device 206 does not need or receive a one-time password (OTP) that might be lost when it is delivered or timed out. Instead, the user may use a secure PIN or other method of authentication that can be specific to the merchant, specific to the 3DS and FIDO client device 206, and is compatible with biometric authentication, e.g., face identification.

The authentication network device 218 is continuously detecting whether a device identifier is included along with information regarding a specific remuneration vehicle, which would indicate a specific device (e.g., mobile phone), as well as information about the authenticator, e.g., face identification. Once the authentication network device 218 matches the device identifier to an enrolled authenticator and verifies authenticity, integrity and origin of the FIDO Attestation Data sent with the 3DS Authentication Request, the authentication network device 218 generates success response that includes an AAV (Accountholder Authentication Value). The AAV gets sent back to the mobile application, the merchant application, or the merchant website because the AAV may be submitted along with a merchant's authentication. When the issuer sees the AAV and the merchant's authentication in an authorization request, the issuer may verify that the transaction has been authenticated up to the standards set by the issuer, and the merchant is more likely to get an approved transaction by the issuer with that AAV cryptogram present.

The 3DS authentication and authorization environment 204 includes the 3DS server 214, an authentication network device 218, a FIDO verification component 222, an Access Control server 226, an issuer 228, an acquirer 232, and an authorization network device 236. In some examples, the authentication network device 218, the FIDO data verification component 222, the Access Control server 226, the issuer 228, the acquirer 232, and the authorization network device 236 may be separate and distinct computing devices each including an electronic processor, a communication interface, and a memory that is communicatively connected to the electronic processor. In other examples, the authentication network device 218, the FIDO data verification component 222, the Access Control server 226, the issuer 228, the acquirer 232, and the authorization network device 236 may be distinct functions that are performed by a plurality of networked servers. In yet other examples, some of the authentication network device 218, the FIDO data verification component 222, the Access Control server 226, the issuer 228, the acquirer 232, and the authorization network device 236 may be distinct computing devices and the remainder may be distinct functions that are performed by a distinct plurality of networked servers or the distinct computing devices. For example, while the FIDO verification component 222 may be illustrated as a distinct computing device, the functions associated with the FIDO verification component 222 may be performed by the authentication network device 218 or any other computing device in the 3DS authentication and authorization environment 204.

The authentication network device 218 is communicatively connected to the 3DS server 214 via a communication link 216. The authentication network device 218 and the 3DS server 214 communicate authentication requests and responses via the communication link 216. The 3DS server 214 authenticates the user's payment card in 3DS and FIDO by sending to the authentication network device 218 an Authentication Request (AReq) which includes the user's payment card number (also referred to as a "primary account number" (PAN)) and FIDO verification data. Specifically, the authentication request is a 3DS Authentication Request (AReq) with injected digitally signed FIDO data.

The authentication network device 218 forwards the FIDO data to the FIDO component 222 via the communication link 220. This link could be an inter-device network communication, inter-program communication on the same device or internal process communication inside the authentication network device software. The FIDO component 222 receives the FIDO data, verifies the authenticity, integrity and origin and transmits back a FIDO authentication response to the authentication network device 218. If the 3DS Authentication Request (AReq) has valid FIDO authentication data, it is a strong signal that the given transaction was originated by the legitimate owner of the payment card and that transaction should be authorized.

The authentication network device 218 also uses the PAN to find the Access Control server (ACS) 226 associated with the PAN and a particular issuer 228. The authentication network device 218 is communicatively connected to the ACS 226 via a communication link 224. The authentication network device 218 forwards the authentication request to the ACS 226 that is associated with the PAN via the communication link 224 to determine whether the user's card is enrolled in 3DS.

The ACS 226 responds to the authentication network device 218 by authenticating (e.g., a risk-based authentication) the user's card with the given PAN via the communication link 224. Upon receiving the authentication from the ACS 226, the authentication network device 218 responds to the 3DS server 214 with an Authentication Response (ARes) message, confirming to the 3DS server 214 the card is authenticated. If card is authenticated, the ARes message includes the URI, of the ACS 226 of the issuer 228. Alternatively, upon receiving the authentications from the FIDO component 222 and the ACS 226, the authentication network device 218 responds to the 3DS server 214 with an Authentication Response (ARes) message, confirming to the 3DS server 214 the card is authenticated for both 3DS and FIDO. If card is authenticated, the ARes message includes the URL of the ACS 226 of the issuer 228.

After receiving the ARes message that authenticates the user's card, the 3DS server 214 transmits a payment authorization request message to an acquirer 232 via a communication link 230. The payment authorization request message includes the URL of the ACS 226 of the issuer 228. Upon receiving the payment authorization request message from the 3DS server 214, the acquirer 232 transmits an authorization message to the ACS 226 and the issuer 228 via the authorization network device 236 and the communication links 234 and 238. The ACS 226 and the issuer 228 transmits an authorization of the payment back to the acquirer 232 via the via the authorization network device 236 and the communication links 234 and 238. Upon receiving the authorization of the payment, the acquirer 232 confirms authorization of the payment authorization message to the 3DS server 214 and the 3DS and FIDO merchant/payment application 210.

Figure 3:
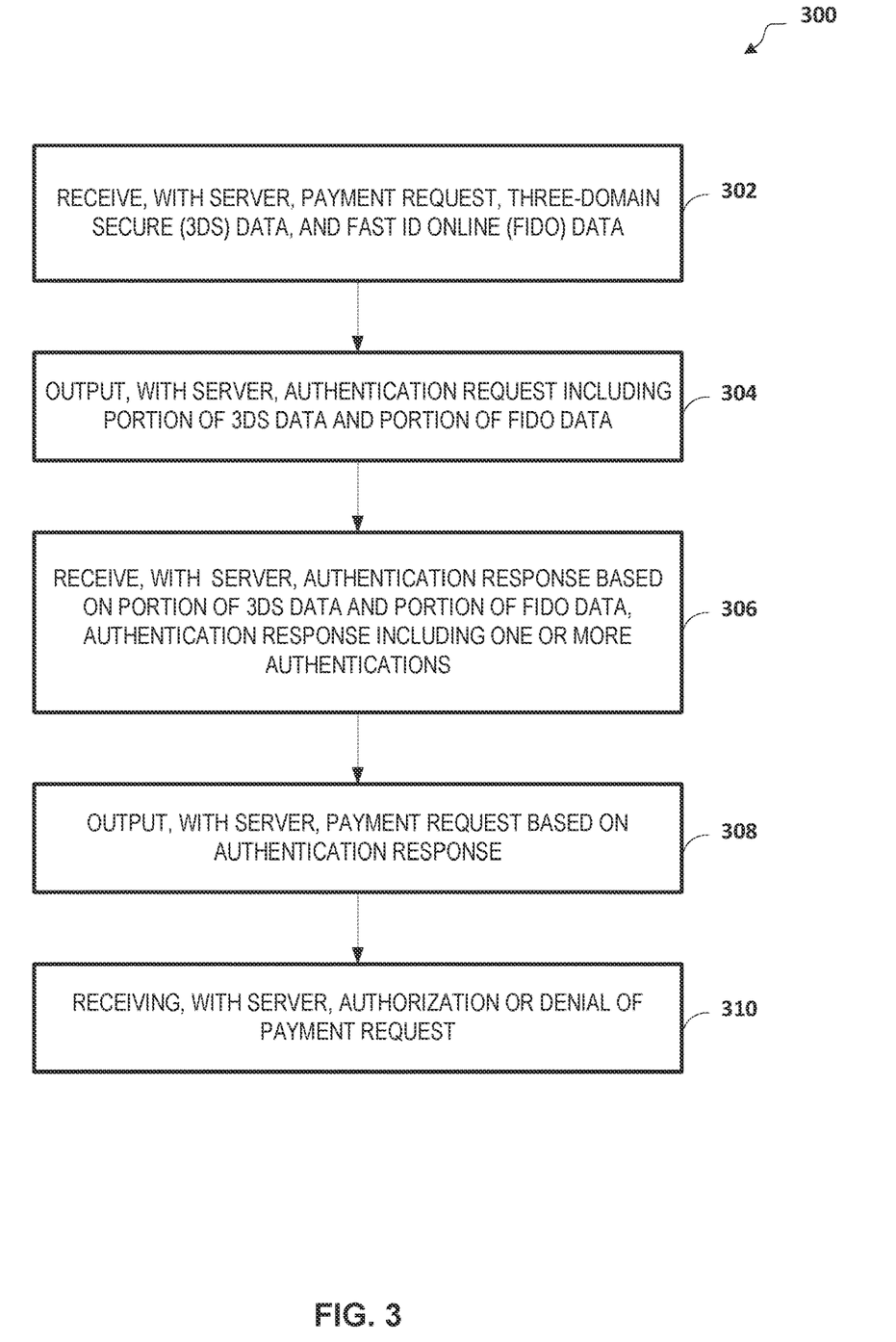
FIG. 3 is a flowchart illustrating a first example method for authentication and authorization of a payment request with the example system of FIG. 2, in accordance with some aspects of the present disclosure.

FIG. 3 is a flowchart illustrating a first example method 300 for authentication and authorization of a payment request with the example system 200 of FIG. 2, in accordance with some aspects of the present disclosure. In example of FIG. 3, the method 300 includes receiving, with a server, the payment request, three-domain secure (3DS) data, and fast ID online (FIDO) data (at block 302), For example, the 3DS server 214 receives a payment request, 3DS data, and FIDO from the 3DS and FIDO client device 206.

In the example of FIG. 3, the method 300 includes outputting, with the server, an authentication request including a portion of the 3DS data and a portion of the FIDO data (at block 304). For example, the 3DS server 214 outputs an authentication request to the authentication network device 218, the authentication request including a portion of the 3DS data and a portion of the FIDO data. In some examples, the portion of the 3DS data may be a personal account number, and the portion of the FIDO data may be a FIDO signature.

In the example of FIG. 3, the method 300 includes receiving, with the server, an authentication response based on the portion of the 3DS data and the portion of the FIDO data, the authentication response including one or more authentications (at block 306). For example, the 3DS server 214 receives an authentication response from the authentication network device 218, the authentication response based on the portion of the 3DS data and the portion of the FIDO data, and the authentication response including one or more authentications.

In the example of FIG. 3, the method 300 includes outputting, with the server, the payment request based on the authentication response (at block 308). For example, the 3DS server 214 outputs the payment request to the acquirer 232 based on the authentication response.

In the example of FIG. 3, the method 300 includes receiving, with the server, an authorization or a denial of the payment request (at block 310). For example, the 3DS server 214 receives an authorization or a denial of the payment request from the acquirer 232.

In some examples, the method 300 may further include receiving, with an authentication network device, the authentication request from the server, outputting, with the authentication network device, the portion of the FIDO data to a FIDO verification server, and receiving, with the authentication network device, a verification from the FIDO verification server, wherein the verification indicates an authentication of the portion of the FIDO data. For example, the authentication network device 218 may receive the authentication request from the server, output the portion of the FIDO data to a FIDO verification server, and receive a verification from the FIDO verification server, wherein the verification indicates an authentication of the portion of the FIDO data.

In these examples, the method 300 may further include receiving, with the authentication network device, the authentication request from the server, determining, with the authentication network device, an access control server based on the portion of the 3DS data, outputting, with the authentication network device, the authentication request to the access control server that is determined, and receiving, with the authentication network device, the authentication response from the access control server. For example, the authentication network device 218 may receive the authentication request from the server, determine an access control server based on the portion of the 3DS data, output the authentication request to the access control server that is determined, and receive the authentication response from the access control server.

In these examples, the method 300 may further include receiving, with the access control server, the authentication request from the authentication network device, authenticating, with the access control server, the authentication request from the authentication network device, and outputting, with the access control server, the authentication response to the authentication network device in response to authenticating the authentication request. For example, the access control server 226 may receive the authentication request from the authentication network device, authenticate the authentication request from the authentication network device, and output the authentication response to the authentication network device in response to authenticating the authentication request. The authentication response may also indicate an authentication of the portion of the 3DS data.

In these examples, the method 300 may further include outputting, with an acquirer, a first authorization message to an issuer associated with the access control server via an authorization network, the first authorization message based on the payment request, receiving, with the acquirer, a second authorization message from the issuer via the authorization network based on the first authorization message, and outputting, with the acquirer, the authorization or the denial of the payment request to the server, the authorization or the denial of the payment request based on the second authorization message. For example, the acquirer 232 may output a first authorization message to an issuer associated with the access control server via an authorization network, the first authorization message based on the payment request, receive a second authorization message from the issuer via the authorization network based on the first authorization message, and output the authorization or the denial of the payment request to the server, the authorization or the denial of the payment request based on the second authorization message.

Figure 4:
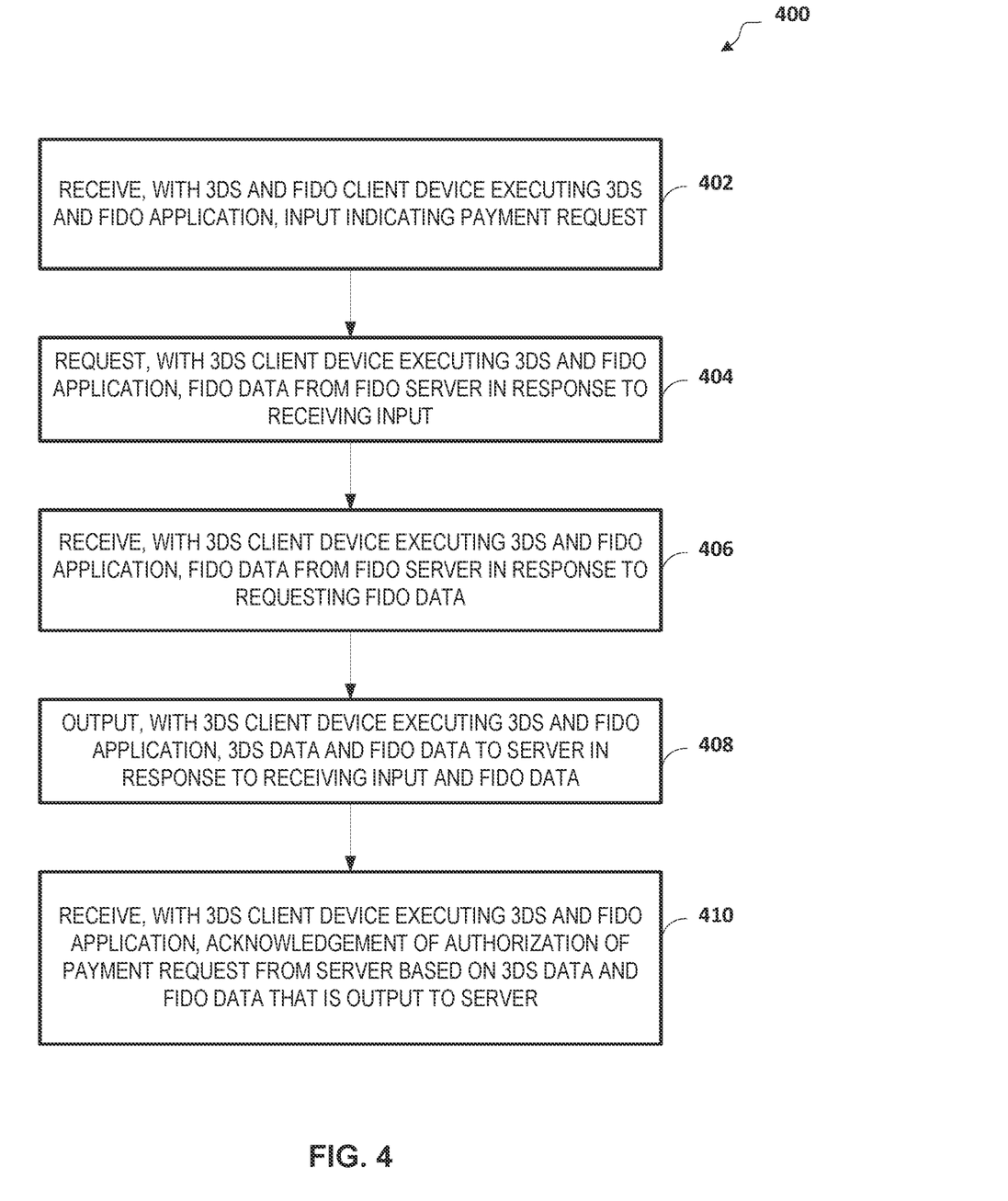
FIG. 4 is a flowchart illustrating a second example method for authentication and authorization of a payment request with the example system of FIG. 2, in accordance with some aspects of the present disclosure.

FIG. 4 is a flowchart illustrating a second example method for authentication and authorization of a payment request with the example system 200 of FIG. 2, in accordance with some aspects of the present disclosure. In the example of FIG. 4, the method 400 includes receiving, with an 3DS and FIDO client device executing an 3DS and FIDO application, an input indicating a payment request (at block 402). For example, the 3DS and FIDO client device 206 receives an input from a cardholder, the input indicating a payment request.

In the example of FIG. 4, the method 400 includes requesting, with the 3DS client device executing the 3DS and FIDO application, the FIDO data from a FIDO server in response to receiving the input (at block 404). For example, the 3DS and FIDO client device 206 requests the FIDO data from the FIDO server 240 in response to receiving the input from the cardholder.

In the example of FIG. 4, the method 400 includes receiving, with the 3DS client device executing the 3DS and FIDO application, the FIDO data from the FIDO server in response to requesting the FIDO data (at block 406). For example, the 3DS and FIDO client device 206 receives the FIDO data from the FIDO server 240 in response to requesting the FIDO data.

In the example FIG. 4, the method 400 includes outputting, with the 3DS client device executing the 3DS and FIDO application, the 3DS data and the FIDO data to the server in response to receiving the input and the FIDO data (at block 408). For example, the 3DS and FIDO client device 206 outputs the 3DS data and the FIDO data to the 3DS server 214 in response to receiving the input and the FIDO data.

In the example of FIG. 4, the method 400 also includes receiving, with the 3DS client device executing the 3DS and FIDO application, acknowledgement of authorization of the payment request from the server based on the 3DS data and the FIDO data that is output to the server (at block 410). For example, the 3DS and FIDO client device 206 receives acknowledgement of authorization of the payment request from the 3DS server 214 based on the 3DS data and the FIDO data that is output to the 3DS server 214.

Many different arrangements of the various components depicted, as well as components not shown, are possible without departing from the spirit and scope of the present disclosure. Embodiments of the present disclosure have been described with the intent to be illustrative rather than restrictive. Alternative embodiments will become apparent to those skilled in the art that do not depart from its scope. A skilled artisan may develop alternative means of implementing the aforementioned improvements without departing from the scope of the present disclosure. It should thus be noted that the matter contained in the above description or shown in the accompanying drawings is to be interpreted as illustrative and not in a limiting sense.

What is claimed is:

1. A system for authenticating and authorizing a payment request, the system comprising:
   a 3DS (Three-Domain Secure) and fast ID online (FIDO) client device;
   a FIDO server storing FIDO attestation data as part of an enrollment of the 3DS and FIDO client device with a localized authentication that is distinct from a one-time password (OTP), wherein the localized authentication is localized to only the 3DS and FIDO client device that is enrolled;
   a fast ID online (FIDO) verification server that is separate and distinct from the FIDO server; and
   a server including a first memory and a first electronic processor communicatively connected to the first memory, the first electronic processor configured to:
      receive the payment request, three-domain secure (3DS) data, and the FIDO attestation data from the 3DS and FIDO client device, wherein the FIDO attestation data is a cryptographic proof of authenticity, integrity, and origin of the 3DS data,
      generate an authentication request by combining a portion of the 3DS data with the FIDO attestation data,
      output the authentication request that is generated to at least one of the FIDO server or the FIDO verification server,
      receive an authentication response based on the authentication request from the at least one of the FIDO server or the FIDO verification server,
      determine whether the authentication response includes a verification of the FIDO attestation data that indicates an authentication of the FIDO attestation data,
      responsive to determining that the authentication response includes the verification, output the payment request, and
      receive an authorization or a denial of the payment request.

2. The system of claim 1,
   wherein the 3DS and FIDO client device includes a second memory and a second electronic processor communicatively connected to the second memory, the second memory including a 3DS and FIDO application, the second electronic processor that, when executing the 3DS and FIDO application, is configured to
      receive an input indicating the payment request,
      request the FIDO attestation data from the FIDO server in response to receiving the input,
      receive the FIDO attestation data from the FIDO server in response to requesting the FIDO attestation data,
      output the 3DS data and the FIDO attestation data to the server in response to receiving the input and the FIDO attestation data, and
      receive an acknowledgement of authorization of the payment request from the server based on the 3DS data and the FIDO attestation data that is output to the server.

3. The system of claim 1, further comprising:
   an authentication network device including a second memory and a second electronic processor communicatively connected to the second memory, the second memory including a database of a plurality of access control servers, and each access control server is associated with one issuer of a plurality of issuers,
   wherein the first electronic processor is further configured to
      output the authentication request to the authentication network device, and
      receive the authentication response from the authentication network device based on the authentication request that is output to the authentication network device.

4. The system of claim 3, wherein the second electronic processor is configured to
   receive the authentication request from the server,
   output the FIDO attestation data to the FIDO verification server,
   receive the verification from the FIDO verification server.

5. The system of claim 3, further comprising:
   an access control server including a third memory and a third electronic processor, the third memory including a database of personal account numbers and authentication program,
   wherein the second electronic processor is configured to
   receive the authentication request from the server,
   determine the access control server based on the portion of the 3DS data,
   output the authentication request to the access control server that is determined, and
   receive the authentication response from the access control server.

6. The system of claim 5, further comprising:
   an acquirer including a fourth memory and a fourth electronic processor communicatively connected to the fourth memory; and
   an authorization network device including a fifth memory and a fifth electronic processor communicatively connected to the fifth memory,
   wherein the fourth electronic processor configured to
      output a first authorization message to an issuer associated with the access control server via the authorization network device, the first authorization message based on the payment request;
      receive a second authorization message from the issuer via the authorization network device based on the first authorization message; and
      output the authorization or the denial of the payment request to the server, the authorization or the denial of the payment request based on the second authorization message.

7. The system of claim 5, wherein the third electronic processor is configured to
receive the authentication request from the authentication network device,
authenticate, with the authentication program, the authentication request from the authentication network device, and
output the authentication response to the authentication network device in response to authenticating the authentication request,
wherein the authentication response indicates an authentication of the portion of the 3DS data.

8. The system of claim 1, wherein the portion of the 3DS data is a personal account number, wherein the FIDO attestation data includes a FIDO signature, wherein the localized authentication includes a public key stored on the FIDO server and a private key stored on the 3DS and FIDO client device as part of the enrollment, and wherein the private key is accessible by one selected from a group consisting of:
a local personal identification number (PIN) authentication,
a local face authentication,
a local fingerprint authentication, and
a local secure electronic token authentication.

9. A method for authenticating and authorizing a payment request, the method comprising:
receiving, with a server, the payment request, three-domain secure (3DS) data, and a fast ID online (FIDO) attestation data from a 3DS and FIDO client device, wherein the FIDO attestation data is a cryptographic proof of authenticity, integrity, and origin of the 3DS data, and wherein the FIDO server stores the FIDO attestation data as part of an enrollment of the 3DS and FIDO client device with a localized authentication that is distinct from a one-time password (OTP), wherein the localized authentication is localized to only the 3DS and FIDO client device that is enrolled;
generating, with the server, an authentication request by combining a portion of the 3DS data with the FIDO attestation data;
outputting, with the server, the authentication request that is generated to at least one of the FIDO server or a FIDO verification server;
receiving, with the server, an authentication response based on the authentication request from the at least one of the FIDO server or the FIDO verification server;
determining, with the server, whether the authentication response includes a verification of the FIDO attestation data that indicates an authentication of the FIDO attestation data; and
outputting, with the server, the payment request in response to determining that the authentication response includes the verification; and
receiving, with the server, an authorization or a denial of the payment request.

10. The method of claim 9, further comprising:
receiving, with the 3DS and FIDO client device executing an 3DS and FIDO application, an input indicating the payment request;
requesting, with the 3DS client device executing the 3DS and FIDO application, the FIDO attestation data from a FIDO server in response to receiving the input;
receiving, with the 3DS client device executing the 3DS and FIDO application, the FIDO attestation data from the FIDO server in response to requesting the FIDO attestation data;
outputting, with the 3DS client device executing the 3DS and FIDO application, the 3DS data and the FIDO attestation data to the server in response to receiving the input and the FIDO attestation data; and
receiving, with the 3DS client device executing the 3DS and FIDO application, acknowledgement of authorization of the payment request from the server based on the 3DS data and the FIDO attestation data that is output to the server.

11. The method of claim 9, wherein the portion of the 3DS data is a personal account number, wherein the FIDO attestation data includes a FIDO signature, wherein the localized authentication includes a public key stored on the FIDO server and a private key stored on the 3DS and FIDO client device as part of the enrollment, and wherein the private key is accessible by one selected from a group consisting of:
a local personal identification number (PIN) authentication,
a local face authentication,
a local fingerprint authentication, and
a local secure electronic token authentication.

12. The method of claim 11, further comprising:
receiving, with an authentication network device, the authentication request from the server;
outputting, with the authentication network device, the FIDO attestation data to the FIDO verification server;
receiving, with the authentication network device, a verification from the FIDO verification server.

13. The method of claim 12, further comprising:
receiving, with the authentication network device, the authentication request from the server;
determining, with the authentication network device, an access control server based on the portion of the 3DS data;
outputting, with the authentication network device, the authentication request to the access control server that is determined; and
receiving, with the authentication network device, the authentication response from the access control server.

14. The method of claim 13, further comprising:
receiving, with the access control server, the authentication request from the authentication network device;
authenticating, with the access control server, the authentication request from the authentication network device; and
outputting, with the access control server, the authentication response to the authentication network device in response to authenticating the authentication request, wherein the authentication response indicates an authentication of the portion of the 3DS data.

15. The method of claim 13, further comprising:
outputting, with an acquirer, a first authorization message to an issuer associated with the access control server via an authorization network, the first authorization message based on the payment request;
receiving, with the acquirer, a second authorization message from the issuer via the authorization network based on the first authorization message; and
outputting, with the acquirer, the authorization or the denial of the payment request to the server, the authorization or the denial of the payment request based on the second authorization message.

16. A non-transitory computer-readable medium comprising instructions that, when executed by an electronic processor, cause the electronic processor to perform a set of operations comprising:

receiving a payment request, three-domain secure (3DS) data, and a fast ID online (FIDO) attestation data from a 3DS and FIDO client device, wherein the FIDO attestation data is a cryptographic proof of authenticity, integrity, and origin of the 3DS data, and wherein a FIDO server stores the FIDO attestation data as part of an enrollment of the 3DS and FIDO client device with a localized authentication that is distinct from a one-time password (OTP), wherein the localized authentication is localized to only the 3DS and FIDO client device that is enrolled;

generating an authentication request by combining a portion of the 3DS data with the FIDO attestation data;

outputting the authentication request that is generated to at least one of the FIDO server or a FIDO verification server;

receiving an authentication response based on the authentication request from the at least one of the FIDO server or the FIDO verification server;

determining whether the authentication response includes a verification of the FIDO attestation data that indicates an authentication of the FIDO attestation data;

outputting the payment request in response to determining that the authentication response includes the verification; and receiving an authorization or a denial of the payment request.

17. The non-transitory computer-readable medium of claim 16, wherein the authentication request is output to an authentication network device, and wherein the authentication response is from the authentication network device.

18. The non-transitory computer-readable medium of claim 16, wherein the portion of the 3DS data is a personal account number, and wherein the FIDO attestation data includes a FIDO signature, wherein the localized authentication includes a public key stored on the FIDO server and a private key stored on the 3DS and FIDO client device as part of the enrollment, and wherein the private key is accessible by one selected from a group consisting of:
  a local personal identification number (PIN) authentication,
  a local face authentication,
  a local fingerprint authentication, and
  a local secure electronic token authentication.

19. A non-transitory computer-readable medium comprising instructions that, when executed by an electronic processor, cause the electronic processor to perform a set of operations, the set of operations comprising:
  receiving an input indicating a payment request;
  determining 3DS (Three-Domain Secure) data based on the payment request;
  performing a localized authentication of the payment request;
  requesting a fast ID online (FIDO) attestation data from a FIDO server in response to authenticating the payment request, wherein the FIDO attestation data is a cryptographic proof of authenticity, integrity, and origin of the 3DS data, and wherein the FIDO server stores the FIDO attestation data as part of an enrollment of a 3DS and FIDO client device with the localized authentication that is distinct from a one-time password (OTP), wherein the localized authentication is localized to only the 3DS and FIDO client device that is enrolled;
  receiving the FIDO attestation data from the FIDO server in response to requesting the FIDO attestation data;
  outputting 3DS data and the FIDO attestation data to a second server in response to receiving the input and the FIDO attestation data; and
  receiving acknowledgement of authorization of the payment request from the second server based on the FIDO attestation data and the 3DS data that is output to the second server.

20. The non-transitory computer-readable medium of claim 19, wherein a portion of the 3DS data is a personal account number, wherein the FIDO attestation data includes a FIDO signature, wherein the localized authentication includes a public key stored on the FIDO server and a private key stored on the 3DS and FIDO client device as part of the enrollment, and wherein the private key is accessible by one selected from a group consisting of:
  a local personal identification number (PIN) authentication,
  a local face authentication,
  a local fingerprint authentication, and
  a local secure electronic token authentication.

* * * * *